US012541870B2

(12) United States Patent
Yang et al.

(10) Patent No.: US 12,541,870 B2
(45) Date of Patent: Feb. 3, 2026

(54) DIMENSION DETECTION DEVICE AND DIMENSION DETECTION METHOD

(71) Applicant: CONTEMPORARY AMPEREX TECHNOLOGY CO., LIMITED, Ningde (CN)

(72) Inventors: Chaohong Yang, Ningde (CN); Wei Luo, Ningde (CN); Guijia Qiu, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 0 days.

(21) Appl. No.: 19/211,221

(22) Filed: May 18, 2025

(65) Prior Publication Data

US 2025/0278849 A1 Sep. 4, 2025

Related U.S. Application Data

(63) Continuation of application No. PCT/CN2024/112162, filed on Aug. 14, 2024.

(30) Foreign Application Priority Data

Jan. 18, 2024 (CN) .......................... 202410074110.6

(51) Int. Cl.
*H01L 27/00* (2006.01)
*G01B 11/24* (2006.01)
(Continued)

(52) U.S. Cl.
CPC ................ *G06T 7/60* (2013.01); *G01B 11/24* (2013.01); *G06T 7/80* (2017.01); *H01M 10/4285* (2013.01); *H04N 23/695* (2023.01)

(58) Field of Classification Search
CPC .. G06T 7/60; G06T 7/80; G01B 11/24; G01B 11/00; G01B 11/02; G01B 11/022; H01M 10/4285; H04N 23/695; Y02E 60/10
See application file for complete search history.

(56) References Cited

U.S. PATENT DOCUMENTS 12,092,589 B1 * 9/2024 Bosua ..................... H01Q 21/06
12,480,840 B1 * 11/2025 Mah ......................... G01N 1/04
(Continued)

FOREIGN PATENT DOCUMENTS

CN 207197448 U 4/2018
CN 110230981 A 9/2019
(Continued)

OTHER PUBLICATIONS

The World Intellectual Property Organization (WIPO) International Search Report for PCT/CN2024/112162 Oct. 22, 2024 6 Pages (including translation).
(Continued)

*Primary Examiner* — Howard D Brown, Jr.
(74) *Attorney, Agent, or Firm* — Anova Law Group, PLLC

(57) ABSTRACT

A dimension detection device includes: a frame, a detection area being disposed on the frame; two first dimension detection apparatuses disposed on the frame, the two first dimension detection apparatuses being positioned on two opposite sides of the detection area; and two second dimension detection apparatuses disposed on the frame, the two second dimension detection apparatuses being positioned on other two opposite sides of the detection area. The first dimension detection apparatus includes a first motion apparatus and a first image acquisition assembly, and the first motion apparatus is capable of driving the first image acquisition assembly to move. The second dimension detection apparatus includes a second motion apparatus and a
(Continued)

second image acquisition assembly, and the second motion apparatus is capable of driving the second image acquisition assembly to move.

18 Claims, 8 Drawing Sheets

(51) Int. Cl.
  *G06T 7/60* (2017.01)
  *G06T 7/80* (2017.01)
  *H01M 10/42* (2006.01)
  *H04N 23/695* (2023.01)

(56) References Cited

U.S. PATENT DOCUMENTS

| | | | | |
|---|---|---|---|---|
| 2001/0028025 | A1* | 10/2001 | Pease | G01B 11/26 |
| | | | | 250/559.19 |
| 2014/0118730 | A1* | 5/2014 | Kavaldjiev | G01N 21/9501 |
| | | | | 257/438 |
| 2020/0225151 | A1* | 7/2020 | Wang | G01N 21/3563 |
| 2024/0020864 | A1* | 1/2024 | Schindler | G01B 11/2504 |
| 2024/0194925 | A1* | 6/2024 | Yoon | H01M 10/0404 |

FOREIGN PATENT DOCUMENTS

| | | |
|---|---|---|
| CN | 110954160 A | 4/2020 |
| CN | 111366084 A | 7/2020 |
| CN | 111721204 A | 9/2020 |
| CN | 111721205 A | 9/2020 |
| CN | 111879241 A | 11/2020 |
| CN | 211926765 U | 11/2020 |
| CN | 212779107 U | 3/2021 |
| CN | 114166119 A | 3/2022 |
| CN | 114739909 A | 7/2022 |
| CN | 115077396 A | 9/2022 |
| CN | 115507748 A | 12/2022 |
| CN | 115574726 A | 1/2023 |
| CN | 218270601 U | 1/2023 |
| CN | 116164654 A | 5/2023 |
| CN | 117589062 A | 2/2024 |
| CN | 117589063 A | 2/2024 |
| JP | 2015137920 A | 7/2015 |
| KR | 20130123099 A | 11/2013 |
| KR | 101866942 B1 | 6/2018 |
| KR | 20220089357 A | 6/2022 |

OTHER PUBLICATIONS

State Intellectual Property Office of China Notice of Registration and Grant of Utility Model Patent for Application No. 202410074110.6 Mar. 13, 2024 7 pages (including translation).
State Intellectual Property Office of China First Office Action for Application No. 202410074110.6 Feb. 24, 2024 10 pages (including translation).
State Intellectual Property Office of China Notice of Examination Opinion on Patent Application Rapid Pre examination Request for Pre-examination case No. YS03820241000067 Jan. 10, 2024 6 pages (including translation).

* cited by examiner

DIMENSION DETECTION DEVICE AND DIMENSION DETECTION METHOD

CROSS-REFERENCE TO RELATED APPLICATIONS

The present application is a continuation of International Application No. PCT/CN2024/112162, filed on Aug. 14, 2024, which claims priority to Chinese Patent Application No. 2024100741106, entitled "DIMENSION DETECTION DEVICE AND DIMENSION DETECTION METHOD", filed on Jan. 18, 2024, which are incorporated herein by reference in their entirety.

TECHNICAL FIELD

The present application relates to the technical field of finished lithium battery measurement, and in particular, to a dimension detection device and a dimension detection method.

BACKGROUND

Geometric tolerances frequently occur in the field of dimension measurement for finished lithium batteries, necessitating efficient measurement of the geometric tolerances. Since the dimension of a single finished battery is large, the measurement process for large-dimension finished batteries in related technologies typically requires personnel to manually hoist the battery and use gauges for dimension detection.

However, the above gauges can only result in the problem of low detection accuracy.

SUMMARY

In view of the above, it is needed to provide a dimension detection device and a dimension detection method capable of performing geometric tolerance or dimension detection on large-dimension products.

In a first aspect, the present application provides a dimension detection device, and the dimension detection device includes:
- a frame, a battery to be tested being disposed in a detection area of the frame;
- at least two first dimension detection apparatuses disposed on the frame, the at least two first dimension detection apparatuses being positioned on two opposite sides of the battery to be tested; and
- at least two second dimension detection apparatuses disposed on the frame, the at least two second dimension detection apparatuses being positioned on other two opposite sides of the battery to be tested,
- where the first dimension detection apparatus includes a first motion apparatus and a first image acquisition assembly, and the first motion apparatus is capable of driving the first image acquisition assembly to move;
- the second dimension detection apparatus includes a second motion apparatus and a second image acquisition assembly, and the second motion apparatus is capable of driving the second image acquisition assembly to move.

The dimension detection device according to embodiments of the present application provides a device for geometric tolerance detection on each surface of a large-dimension product. A plurality of surface dimension detection apparatuses corresponding to the surfaces are designed according to the detection requirements of the surfaces, enabling comprehensive dimension information collection and detection, thereby improving detection accuracy to some extent. In addition, the above dimension detection device can also achieve the quantitative measurement of the battery to be tested to obtain a quantitative value of a measurement result.

In one embodiment, the first motion apparatus includes a first linear motion mechanism and a first lifting mechanism; the first linear motion mechanism is configured to be capable of driving the first lifting mechanism to move in a first direction, the first direction being within a horizontal plane; the first image acquisition assembly is installed on the first lifting mechanism, and the first lifting mechanism is configured to be capable of driving the first image acquisition assembly to lift.

The first motion apparatus in the dimension detection device according to the embodiments of the present application can drive the first image acquisition assembly to move in two different directions, allowing the first image acquisition assembly to acquire image feature values from a larger area range on one end surface of the battery to be tested, thereby improving the detection precision of subsequent detection based on the image feature values.

In one embodiment, the second motion apparatus includes a second linear motion mechanism and a second lifting mechanism; the second linear motion mechanism is configured to be capable of driving the second lifting mechanism to move in a second direction, the second direction being within a horizontal plane and intersecting with the first direction; the second image acquisition assembly is installed on the second lifting mechanism, and the second lifting mechanism is configured to be capable of driving the second image acquisition assembly to lift.

The second motion apparatus in the dimension detection device according to the embodiments of the present application can drive the second image acquisition assembly to move in two different directions, allowing the second image acquisition assembly to acquire image feature values from a larger area range on the other end surface of the battery to be tested, thereby improving the detection precision of subsequent detection based on the image feature values.

In one embodiment, the first image acquisition assembly includes a first contour camera and at least one first area array detection camera, the first contour camera and the first area array detection camera being both disposed toward the battery to be tested.

In the first image acquisition assembly according to the embodiments of the present application, the first area array detection cameras disposed at different positions can form a backlight scene to complete the detection operation. The backlight can be used to highlight the hole position features of the thin sheet while blurring the interference on the product surface, thereby achieving the effect of improving measurement precision.

In one embodiment, the second image acquisition assembly includes a second contour camera and at least one second area array detection camera, the second contour camera and the second area array detection camera being both disposed toward the battery to be tested.

In the second image acquisition assembly according to the embodiments of the present application, the second area array detection cameras disposed at different positions can form a backlight scene to complete the detection operation. The backlight can be used to highlight the hole position features of the thin sheet while blurring the interference on the product surface, thereby achieving the effect of improving measurement precision.

In one embodiment, the dimension detection device further includes a third dimension detection apparatus, the third dimension detection apparatus being disposed on the frame; the third dimension detection apparatus includes a third motion apparatus and a third image acquisition assembly, the third image acquisition assembly is positioned above the battery to be tested, and the third motion apparatus is capable of driving the third image acquisition assembly to move.

The third motion apparatus in the dimension detection device according to the embodiments of the present application can drive the third image acquisition assembly to move in two different directions, allowing the third image acquisition assembly to acquire image feature values from a larger area range on a top surface of the battery to be tested, thereby improving the detection precision of subsequent detection based on the image feature values.

In one embodiment, the third motion apparatus includes a third linear motion mechanism and a third lifting mechanism; the third linear motion mechanism is configured to be capable of driving the third lifting mechanism to move in the first direction or the second direction, the second direction being within a horizontal plane and intersecting with the first direction; the third image acquisition assembly is installed on the third lifting mechanism, and the third lifting mechanism is configured to be capable of driving the third image acquisition assembly to lift.

The third motion apparatus in the dimension detection device according to the embodiments of the present application can drive the third image acquisition assembly to move in two different directions, allowing the third image acquisition assembly to acquire image feature values from a larger area range on a top surface of the battery to be tested, thereby improving the detection precision of subsequent detection based on the image feature values.

In one embodiment, the third image acquisition assembly includes a third area array detection camera and at least two third contour cameras, the third area array detection camera and the third contour cameras being both disposed toward the battery to be tested.

In the third image acquisition assembly according to the embodiments of the present application, the third contour cameras disposed at different positions can form a backlight scene to complete the detection operation. The backlight can be used to highlight contour features while blurring the interference on the product surface, thereby achieving the effect of improving measurement precision.

In one embodiment, the frame includes a fixed frame body and a lifting platform, and the first dimension detection apparatus and the second dimension detection apparatus are both disposed on the fixed frame body; the battery to be tested is disposed in a detection area on the lifting platform.

The frame according to the embodiments of the present application is equipped with the function of adjusting the test position of the battery to be tested, without manual adjustment of the battery to be tested, enabling automatic test and improving test accuracy.

In one embodiment, the lifting platform includes a workbench and a fourth lifting mechanism disposed at a bottom of the workbench.

The frame according to the embodiments of the present application can be equipped with the function of adjusting the test position of the battery to be tested through the fourth lifting mechanism, without manual adjustment of the battery to be tested, enabling automatic test and improving test accuracy.

In one embodiment, the lifting platform further includes a height sensor disposed on the workbench, the height sensor being configured to detect a height of the battery to be tested positioned in the detection area.

The lifting platform according to the embodiments of the present application can detect the height of the battery to be tested by arranging the height sensor, thereby ensuring the position stability of the battery to be tested and improving measurement precision.

In one embodiment, the dimension detection device further includes a controller disposed on the frame, and the controller is capable of driving the first motion apparatus to drive the first image acquisition assembly to move and driving the second motion apparatus to drive the second image acquisition assembly to move.

The controller according to the embodiments of the present application can process the images acquired by the first image acquisition assembly and the second image acquisition assembly and perform feature value calculation, thereby quickly obtaining the test result.

In a second aspect, the present application provides a dimension detection method, where the dimension detection method is applied to the dimension detection device according to the first aspect, and the dimension detection method includes:

controlling the first motion apparatus to drive the first image acquisition assembly to move to a detection area to detect the battery to be tested, and controlling the second motion apparatus to drive the second image acquisition assembly to move to the detection area to detect the battery to be tested to obtain a detection result.

In one embodiment, the method further includes:
calibrating, according to a measurement value of a preset calibration block and an image feature value of the calibration block, coordinate systems of the first image acquisition assembly and the second image acquisition assembly to obtain a calibrated first image acquisition assembly and a calibrated second image acquisition assembly; and
controlling the first motion apparatus to drive the first image acquisition assembly to move to the detection area to detect the battery to be tested, and controlling the second motion apparatus to drive the second image acquisition assembly to move to the detection area to detect the battery to be tested to obtain the detection result includes:
controlling the first motion apparatus to drive the calibrated first image acquisition assembly to move to the detection area to detect the battery to be tested, and controlling the second motion apparatus to drive the calibrated second image acquisition assembly to move to the detection area to detect the battery to be tested to obtain the detection result.

In one embodiment, a method for obtaining the measurement value of the calibration block includes:
controlling the fourth lifting mechanism to place the preset calibration block in the detection area; and
measuring the calibration block to obtain the measurement value of the calibration block.

In one embodiment, obtaining the image feature value of the calibration block includes:
controlling the first motion apparatus to drive the first image acquisition assembly to move to the detection area to perform image acquisition toward the calibration block, and controlling the second motion apparatus to drive the second image acquisition assembly to move to the detection area to perform image acquisition toward the calibration block to obtain the image feature value of the calibration block.

In one embodiment, controlling the first motion apparatus to drive the calibrated first image acquisition assembly to move to the detection area to detect the battery to be tested, and controlling the second motion apparatus to drive the calibrated second image acquisition assembly to move to the detection area to detect the battery to be tested to obtain the detection result includes:

driving the fourth lifting mechanism to place the battery to be tested in the detection area;

controlling the first motion apparatus to drive the calibrated first image acquisition assembly to move to the detection area to perform image acquisition on the battery, and controlling the second motion apparatus to drive the calibrated second image acquisition assembly to move to the detection area to perform image acquisition on the battery to obtain a feature image of the battery to be tested; and obtaining, according to the feature image of the battery to be tested and the measurement value of the calibration block, the detection result.

In one embodiment, the method further includes:

performing, according to the calibrated first image acquisition assembly and the calibrated second image acquisition assembly, a product reference establishment to obtain a reference-established first image acquisition assembly and a reference-established second image acquisition assembly; and controlling the first motion apparatus to drive the calibrated first image acquisition assembly to move to the detection area to perform image acquisition on the battery to be tested, and controlling the second motion apparatus to drive the calibrated second image acquisition assembly to move to the detection area to perform image acquisition on the battery to be tested to obtain the feature image of the battery to be tested includes:

controlling the first motion apparatus to drive the reference-established first image acquisition assembly to move to the detection area to perform image acquisition on the battery to be tested, and controlling the second motion apparatus to drive the reference-established second image acquisition assembly to move to the detection area to perform image acquisition on the battery to be tested to obtain the feature image of the battery to be tested.

In one embodiment, the method further includes:

debugging a position of the first image acquisition assembly and a position of the second image acquisition assembly.

In one embodiment, the method further includes:

performing precision calibration on the first image acquisition assembly and the second image acquisition assembly.

The above description is only an overview of the technical solutions of the present application. To more clearly understand the technical means of the present application to enable implementation in accordance with the content of the specification and to make the above and other purposes, features, and advantages of the present application more obvious and easy to understand, the detailed description of the present application is provided below.

BRIEF DESCRIPTION OF THE DRAWINGS

By reading the detailed description of the embodiments below, various additional advantages and benefits will become clear to those of ordinary skill in the art. The drawings are provided solely for the purpose of illustrating some embodiments and are not to be construed as limiting the scope of the present application. Furthermore, the same reference numerals in all the drawings denote identical components. In the drawings.

DETAILED DESCRIPTION

To make the objectives, technical solutions, and advantages of the present application clearer, the present application is further described in detail below with reference to the drawings and embodiments. It should be understood that the specific embodiments described herein are merely illustrative of the present application and do not limit the present application.

Unless otherwise defined, all technical and scientific terms used herein have the same meaning as commonly understood by those skilled in the technical field to which the present application belongs. The terms used herein are only for illustrating the specific embodiments, rather than limiting the present application. The terms "include", "comprise", and "provided with", and any variations thereof in the specification and claims of the present application and the above-mentioned drawing description encompass non-exclusive inclusions.

In the description of the embodiments of the present application, technical terms such as "first", "second", and the like are only used to distinguish different objects and should not be interpreted as indicating or implying the relative importance or implicitly indicating the number, specific order, or primary and secondary relationship of the indicated technical features. In the description of the embodiments of the present application, unless otherwise specifically defined, "a plurality of" means two or more than two.

Reference herein to "embodiment" means that a particular feature, structure, or characteristic described in combination with the embodiment can be included in at least one embodiment of the present application. The references of the word in the context of the specification do not necessarily refer to the same embodiment, nor to separate or alternative embodiments exclusive of other embodiments. It will be explicitly and implicitly appreciated by those skilled in the art that the embodiments described herein can be combined with other embodiments.

At present, when testing a large-dimension battery pack, i.e., a battery pack formed by stacking a plurality of layers of battery modules together, since the dimension of a single large-dimension battery pack is generally 1 m³ or more and the weight of the battery pack is 1 t or more, the measurement scheme for the existing large-dimension battery pack involves manually hoisting the battery by personnel and then using a gauge for dimension measurement. This method has low measurement efficiency, and the gauge can only perform qualitative measurements. In view of the above problem, the embodiments of the present application optimize the dimension measurement method for the existing large-dimension battery and provide a dimension detection device capable of improving test efficiency and test precision. The following embodiments will illustrate the dimension detection device in detail.

Figure 1:
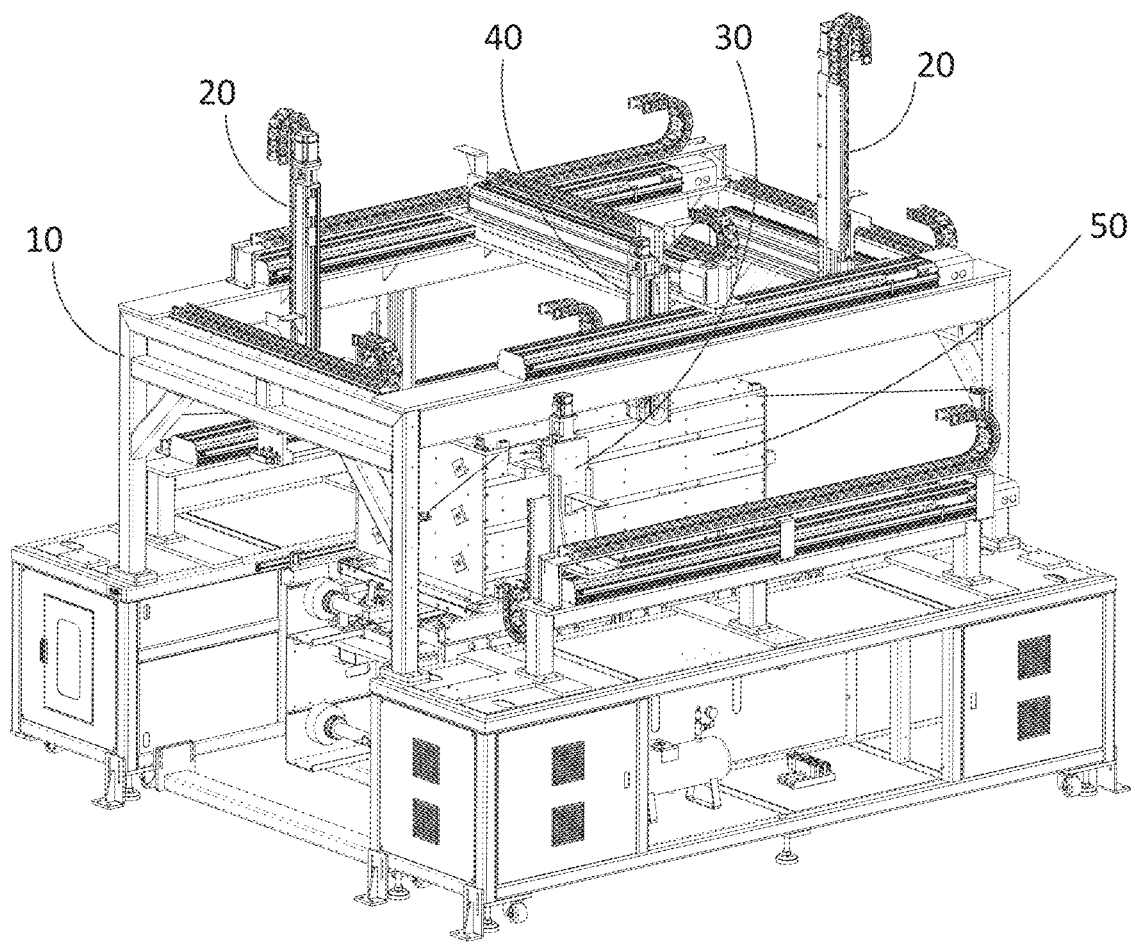
FIG. 1 is a schematic diagram of an overall structure of a dimension detection device according to an embodiment.
Figure 2:
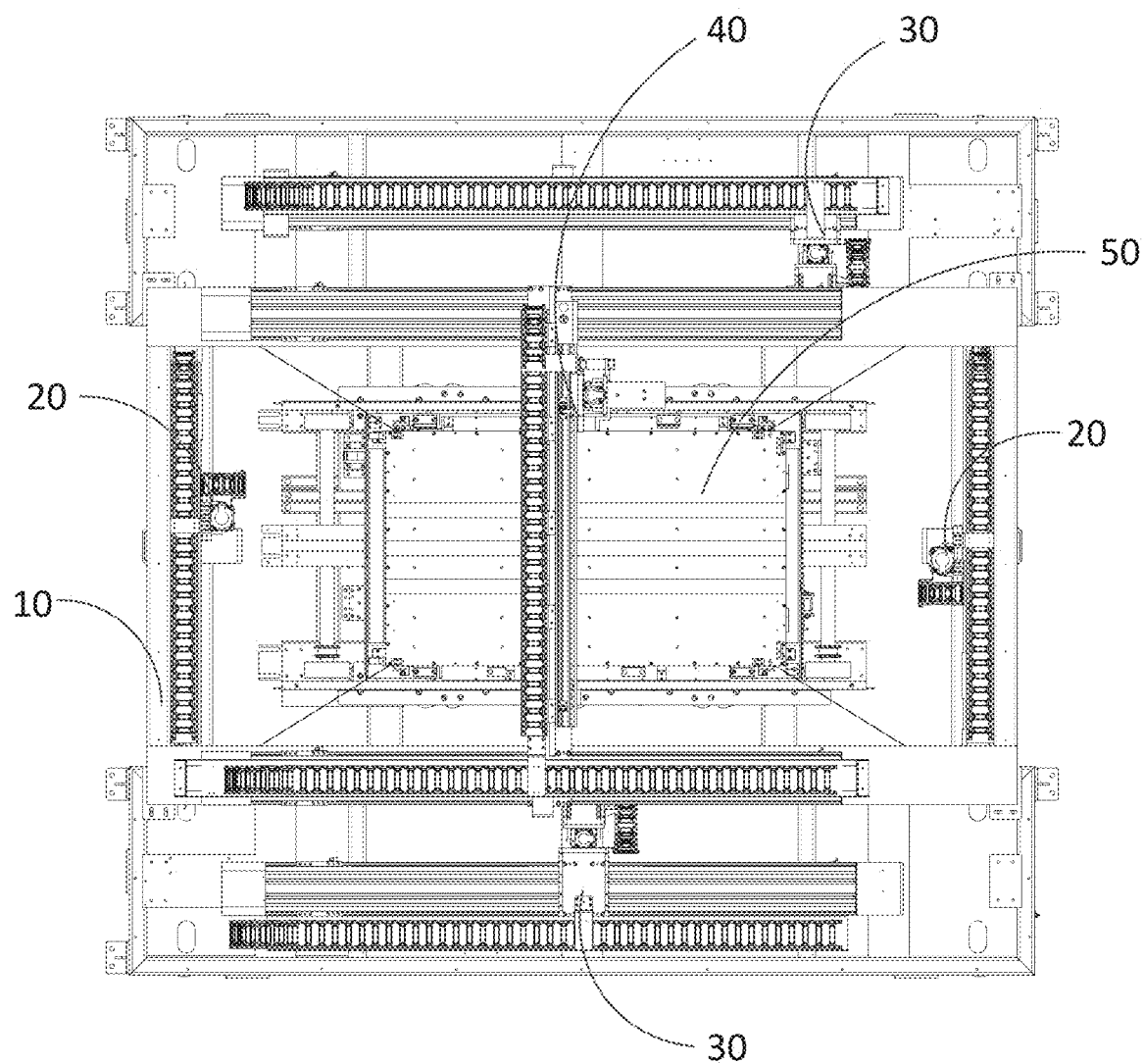
FIG. 2 is a schematic diagram of a top surface of a dimension detection device according to an embodiment.
Figure 3:
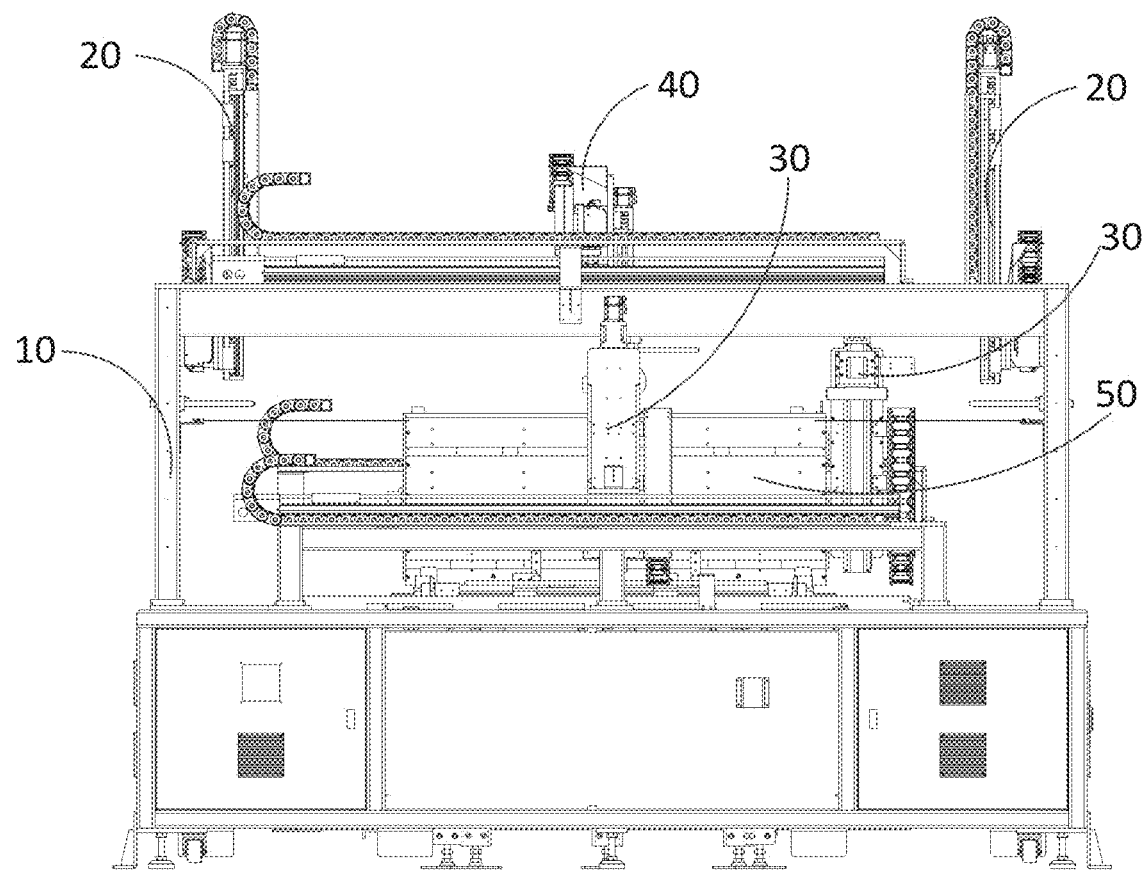
FIG. 3 is a schematic diagram of a side surface of a dimension detection device according to an embodiment.
Figure 4:
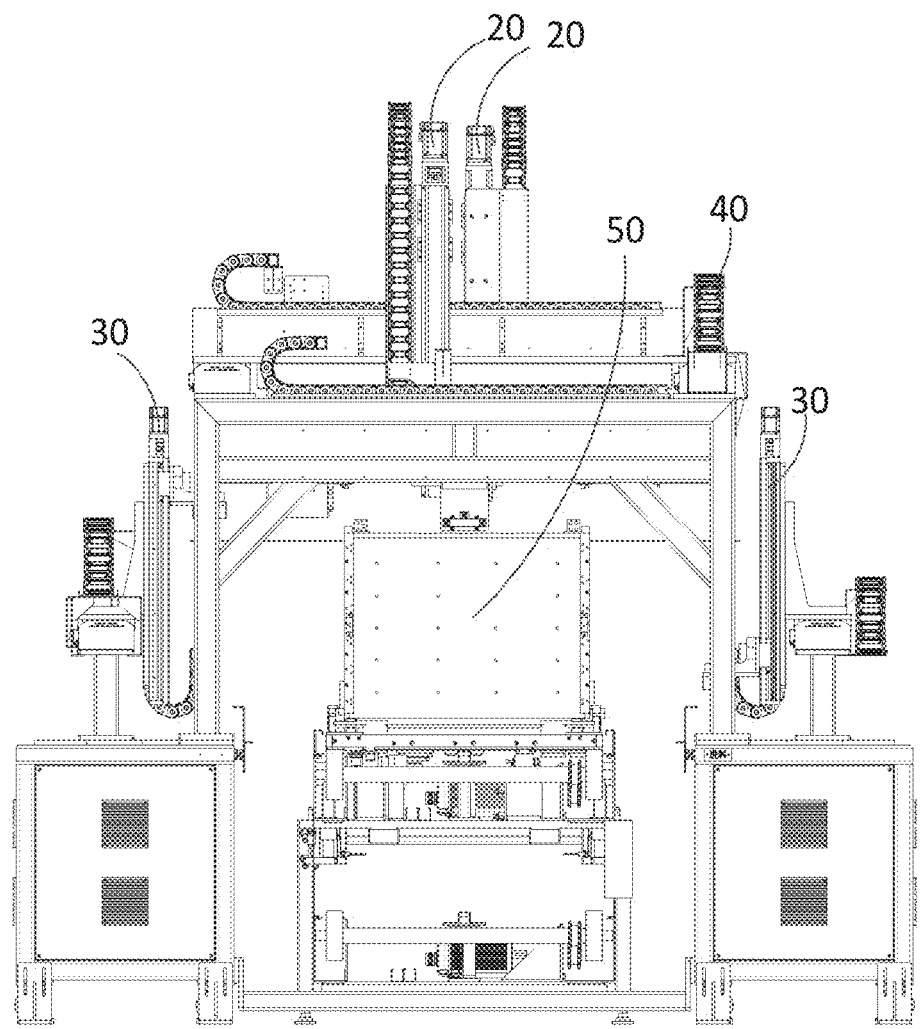
FIG. 4 is a schematic diagram of an end surface of a dimension detection device according to an embodiment.

In one embodiment, the embodiments of FIG. 1 to FIG. 4 are a dimension detection device (FIG. 1 is a three-dimensional schematic diagram of the dimension detection device; FIG. 2 is a schematic diagram of a top surface of the dimension detection device; FIG. 3 is a schematic diagram of a side surface of the dimension detection device; FIG. 4 is a schematic diagram of an end surface of the dimension detection device, where the schematic diagram of the end surface refers to a schematic diagram observed from an angle of the end surface of a battery to be tested, and the end surface of the battery to be tested is a plane perpendicular to the side surface of the battery to be tested). The dimension detection device includes: a frame 10, a battery 50 to be tested being disposed in a detection area of the frame 10; at least two first dimension detection apparatuses 20 disposed on the frame 10 (FIG. 1 is taken as an example, in which only two first dimension detection apparatuses 20 are shown), the at least two first dimension detection apparatuses 20 being positioned on two opposite sides of the battery 50 to be tested; and at least two second dimension detection apparatuses 30 disposed on the frame 10 (FIG. 1 is taken as an example; due to the viewing angle in FIG. 1, only one second dimension detection apparatus 30 is visible, but the dimension detection device described in FIG. 1 actually includes at least two second dimension detection apparatuses 30, which can be referred to the schematic diagram of the top surface in FIG. 2 or the schematic diagram of the end surface in FIG. 4), the at least two second dimension detection apparatuses 30 being positioned on other two opposite sides of the battery 50 to be tested. The first dimension detection apparatus 20 includes a first motion apparatus 201 and a first image acquisition assembly 202, and the first motion apparatus 201 is capable of driving the first image acquisition assembly 202 to move. The second dimension detection apparatus 30 includes a second motion apparatus 301 and a second image acquisition assembly 302, and the second motion apparatus 301 is capable of driving the second image acquisition assembly 302 to move (note: Reference numerals of 201 are not shown in FIG. 1, and the first motion apparatus 201 includes a first linear motion mechanism 2011 and a first lifting mechanism 2012 in FIG. 5, that is, the reference numerals of 201 include 2011 and 2012; reference numerals of 202 are not shown in FIG. 1, and the first image acquisition assembly 202 includes a first contour camera 2021 and a first area array detection camera 2022 in FIG. 5, that is, the reference numerals of 202 include 2021 and 2022; reference numerals of 301 are not shown in FIG. 1, and the second motion apparatus 301 includes a second linear motion mechanism 3011 and a second lifting mechanism 3012 in FIG. 5, that is, the reference numerals of 301 include 3011 and 3012; reference numerals of 302 are not shown in FIG. 1, and the second image acquisition assembly 302 includes a second contour camera 3021 and a second area array detection camera 3022 in FIG. 5, that is, the reference numerals of 302 include 3021 and 3022).

The above first dimension detection apparatus 20 may be fixed to the frame 10 by means of screws, snaps, and the like, allowing for flexible detachment and installation. The above first dimension detection apparatus 20 is configured to detect features of the end surface of the battery 50 to be tested, and different first dimension detection apparatuses 20 can be configured to detect features of different end surfaces of the battery 50 to be tested, for example, features of two end surfaces of the battery 50 to be tested. The above second dimension detection apparatus 30 may be fixed to the frame 10 by means of screws, snaps, and the like, allowing for flexible detachment and installation. The above second dimension detection apparatus 30 is configured to detect features of the side surface of the battery 50 to be tested, and different second dimension detection apparatuses 30 can be configured to detect features of different side surfaces of the battery 50 to be tested, for example, features of two side surfaces of the battery 50 to be tested. In some embodiments, the above first motion apparatus 201 may be a servo control apparatus; the second motion apparatus 301 may be a servo control apparatus.

The above first image acquisition assembly 202 may be fixed to the first motion apparatus 201 by means of screws, snaps, and the like, allowing for flexible detachment and installation. The above first motion apparatus 201 is configured to drive the first image acquisition assembly 202 to move in different directions within a plane, for example, in a horizontal direction or a perpendicular direction. The above first image acquisition assembly 202 may include a plurality of image acquisition cameras of the same type, or a plurality of image acquisition cameras of different types.

The above second image acquisition assembly 302 may be fixed to the second motion apparatus 301 by means of screws, snaps, and the like, allowing for flexible detachment and installation. The above second motion apparatus 301 is configured to drive the second image acquisition assembly 302 to move in different directions within a plane, for example, in a horizontal direction or a perpendicular direction. The above second image acquisition assembly 302 may include a plurality of image acquisition cameras of the same type, or a plurality of image acquisition cameras of different types.

In the embodiments of the present application, after the first image acquisition assembly 202 is installed on the first motion apparatus 201, the first image acquisition assembly 202 can be subjected to precision calibration; after the second image acquisition assembly 302 is installed on the second motion apparatus 202, the second image acquisition assembly 302 can be subjected to precision calibration. Correspondingly, the first motion apparatus 201 is driven to adjust the precision-calibrated first image acquisition assembly 202 to a working position near the detection area, and the second motion apparatus 202 is driven to adjust the precision-calibrated second image acquisition assembly 302 to the working position near the detection area. Afterwards, the measured calibration block may be placed within the detection area of the frame 10, and then the first image acquisition assembly 202 and the second image acquisition assembly 302 that are adjusted in place are activated to acquire images of the calibration block for camera coordinate system calibration. After completing the camera coordinate system calibration, the calibration block can be replaced, and the battery to be tested is placed within the detection area of the frame 10; then the first image acquisition assembly 202 and the second image acquisition assembly 302 after the coordinate system calibration are activated to acquire images of the battery to be tested for geometric tolerance or dimension detection.

The dimension detection device according to the embodiments of the present application provides a device for geometric tolerance detection on each surface of a large-dimension product. The dimension detection apparatuses corresponding to the surfaces are designed according to the detection requirements of the surfaces, enabling comprehensive dimension information collection and detection, thereby improving detection accuracy to some extent. In some embodiments, the above dimension detection device can also achieve the quantitative measurement of the battery to be tested to obtain a quantitative value of a measurement result.

Figure 5:
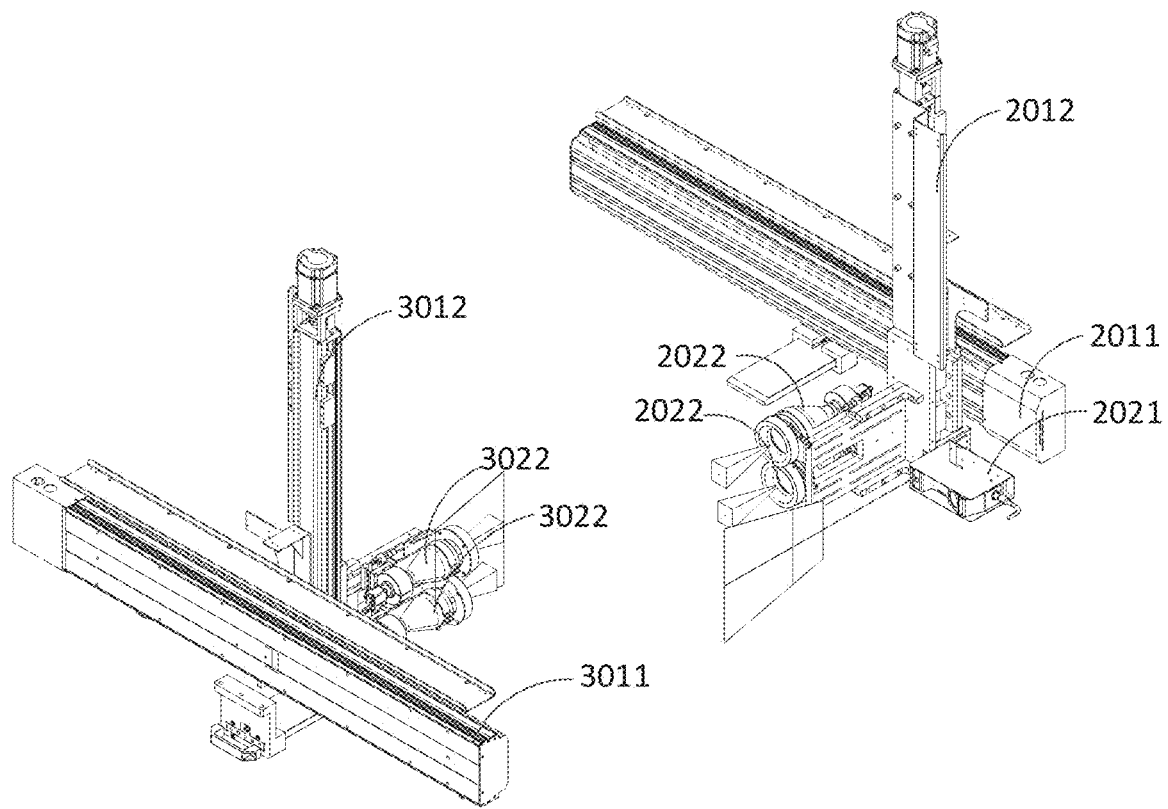
FIG. 5 is a schematic structural diagram of a first motion apparatus and a second motion apparatus according to an embodiment.

In one embodiment, as shown in FIG. 5, the above first motion apparatus 201 includes a first linear motion mechanism 2011 and a first lifting mechanism 2012; the first linear motion mechanism 2011 is configured to be capable of driving the first lifting mechanism 2012 to move in a first direction, the first direction being within a horizontal plane; the first image acquisition assembly 202 is installed on the first lifting mechanism 2012, and the first lifting mechanism 2012 is configured to be capable of driving the first image acquisition assembly 202 to lift (reference numerals of 201 are not shown in FIG. 5, and 201 includes 2011 and 2012).

The above first linear motion mechanism 2011 may be a horizontal sliding shaft provided with a sliding block, and the sliding block can move on the horizontal sliding shaft. The first lifting mechanism 2012 is installed on the sliding block, thereby driving the first lifting mechanism 2012 to move in the horizontal direction. The first lifting mechanism 2012 may be a perpendicular sliding shaft provided with a sliding block, and the sliding block can move on the perpendicular sliding shaft. The first image acquisition assembly 202 is installed on the sliding block, thereby driving the first image acquisition assembly 202 to move in the vertical direction.

In some embodiments, the above first image acquisition assembly 202 may include a first contour camera 2021 and at least one first area array detection camera 2022 (only two first area array detection cameras 2022 are shown in FIG. 5, but the number of the first area array detection cameras 2022 is not limited), and the first contour camera 2021 and the first area array detection camera 2022 are both disposed toward the battery to be tested. The first contour camera 2021 is configured to acquire a contour feature image of one end surface of the product to be detected and to complete end surface contour tolerance detection. The first area array detection camera 2022 is configured to acquire a hole feature image on one end surface of the product to be detected and to complete end surface panel hole detection.

In some embodiments, the above first image acquisition assembly 202 may include one first area array detection camera 2022, or may include a plurality of first area array detection cameras 2022. When the first image acquisition assembly 202 includes a plurality of first area array detection cameras 2022, the plurality of first area array detection cameras 2022 may be area array detection cameras with different fields of view, or may be area array detection cameras with the same field of view. The field of view of the first image acquisition assembly 202 may be expanded by arranging a plurality of area array detection cameras.

In some embodiments, before using the first area array detection camera 2022 and the first contour camera 2021, it is needed to correspond the pixel dimensions and working dimensions of the first area array detection camera 2022 and the first contour camera 2021. The first area array detection camera 2022 and the first contour camera 2021 can calculate the field of view by measuring the planned workstation working distance and lens parameters, and then calculate the actual distance corresponding to a single pixel based on the corresponding field of view. After completing the calculation, the theoretical operating distance of the first area array detection camera 2022 and the first contour camera 2021 at the working distance can be obtained.

In some embodiments, before use, the first area array detection camera 2022 and the first contour camera 2021 need to be subjected to coordinate system calibration based on the measurement value and image feature value of the calibration block. Specifically, according to the Euclidean transformation principle, the corresponding coordinate system rigid body transformation equations and rotation matrix equations can be imported from the measurement value and image feature value of the corresponding calibration block, to obtain the association between the camera coordinate system and the product coordinate system (or world coordinate system). Moreover, based on this association, the coordinate systems of different cameras at different image acquisition stations can be projected onto the product coordinate system, thereby constructing a visual test system through calculation to realize the behavioral tolerance test function.

In some embodiments, the above first image acquisition assembly 202 (reference numerals of 202 are not shown in FIG. 5, and 202 includes 2021 and 2022) may include two first area array detection cameras 2022, and the two first area array detection cameras 2022 may be horizontally disposed side by side on the first lifting mechanism 2012, or the two first area array detection cameras 2022 may be vertically disposed side by side on the first lifting mechanism 2012. The first contour camera 2021 may be disposed at a corresponding position on the same plane as the first area array detection camera 2022, or may be disposed at a corresponding position on a different plane from the first area array detection camera 2022.

In some embodiments, the light source of one of the above first area array detection cameras 2022 is equipped with a diffusion plate, which can soften a light path for the first area array detection camera 2022 to perform image acquisition. At the same time, the light source of the other first area array detection camera 2022 can be turned off, and a backlight environment is formed in the working environment, which can be used to solve the problems of reflection and deformation of the surface of the battery to be tested caused by casting, thereby greatly improving the detection accuracy. In some embodiments, the above first contour camera 2021 may be a three-dimensional (3D) line laser camera.

The first motion apparatus in the dimension detection device according to the embodiments of the present application can drive the first image acquisition assembly to move in two different directions, allowing the first image acquisition assembly to acquire image feature values from a larger area range on one end surface of the battery to be tested, thereby improving the detection precision of subsequent detection based on the image feature values. In some embodiments, the above first area array detection cameras disposed at different positions can form a backlight scene to complete the detection operation. The backlight can be used to highlight the hole position features of the thin sheet while blurring the interference on the product surface, thereby achieving the effect of improving measurement precision.

In one embodiment, as shown in FIG. 5, the second motion apparatus 301 includes a second linear motion mechanism 3011 and a second lifting mechanism 3012; the second linear motion mechanism 3011 is configured to be capable of driving the second lifting mechanism 3012 to move in a second direction, the second direction being within a horizontal plane and intersecting with the first direction; the second image acquisition assembly 302 is installed on the second lifting mechanism 3012, and the second lifting mechanism 3012 is configured to be capable of driving the second image acquisition assembly 302 to lift (reference numerals of 301 are not shown in FIG. 5, and 301 includes 3011 and 3012).

The above second linear motion mechanism 3011 may be a horizontal sliding shaft provided with a sliding block, and the sliding block can move on the horizontal sliding shaft. The second lifting mechanism 3012 is installed on the sliding block, thereby driving the second lifting mechanism 3012 to move in the horizontal direction. The second lifting mechanism 3012 may be a perpendicular sliding shaft provided with a sliding block, and the sliding block can move on the perpendicular sliding shaft. The second image acquisition assembly 302 is installed on the sliding block, thereby driving the second image acquisition assembly 302 to move in the vertical direction.

In some embodiments, the above second image acquisition assembly 302 may include a second contour camera 3021 and at least one second area array detection camera 3022 (only two second area array detection cameras 3022 are shown in FIG. 5, but the number of the second area array detection cameras 3022 is not limited; in some embodiments, due to the viewing angle in FIG. 5, the second contour camera 3021 is invisible, but the second image acquisition assembly 302 in FIG. 5 includes the second contour camera 3021, and the second contour camera 3021 is disposed at a position adjacent to the second area array detection camera 3022; reference can be made to the arrangement position of the first contour camera 2021). The second contour camera 3021 and the second area array detection camera 3022 are both disposed toward the battery to be tested. The second contour camera 3021 is configured to acquire a shape feature image of the other end surface of the product to be detected and to complete end surface contour tolerance detection. The second area array detection camera 3022 is configured to acquire a hole feature image on the other end surface of the product to be detected and to complete end surface panel hole detection.

In some embodiments, the above second image acquisition assembly 302 (reference numerals of 302 are not shown in FIG. 5, and 302 includes 3021 and 3022) may include one second area array detection camera 3022, or may include a plurality of second area array detection cameras 3022. When the second image acquisition assembly 302 includes a plurality of second area array detection cameras 3022, the plurality of second area array detection cameras 3022 may be area array detection cameras with different fields of view, or may be area array detection cameras with the same field of view. The field of view of the second image acquisition assembly 302 may be expanded by arranging a plurality of area array detection cameras.

In some embodiments, before using the second area array detection camera 3022 and the second contour camera 3021, it is needed to correspond the pixel dimensions and working dimensions of the second area array detection camera 3022 and the second contour camera 3021. The second area array detection camera 3022 and the second contour camera 3021 can calculate the field of view by measuring the planned workstation working distance and lens parameter, and then calculate the actual distance corresponding to a single pixel based on the corresponding field of view. After completing the calculation, the theoretical operating distance of the second area array detection camera 3022 at the working distance can be obtained. The above second contour camera 3021 may be a 3D line laser camera.

In some embodiments, before use, the second area array detection camera 3022 and the second contour camera 3021 need to be subjected to coordinate system calibration based on the measurement value and image feature value of the calibration block. Specifically, according to the Euclidean transformation principle, the corresponding coordinate system rigid body transformation equations and rotation matrix equations can be imported from the measurement value and image feature value of the corresponding calibration block, to obtain the association between the camera coordinate system and the product coordinate system (or world coordinate system). Moreover, based on this association, the coordinate systems of different cameras at different image acquisition stations can be projected onto the product coordinate system, thereby constructing a visual test system through calculation to realize the behavioral tolerance test function.

In some embodiments, the above second image acquisition assembly 302 may include two second area array detection cameras 3022, and the two second area array detection cameras 3022 may be horizontally disposed side by side on the second lifting mechanism 3012, or the two second area array detection cameras 3022 may be vertically disposed side by side on the second lifting mechanism 3012. The second contour camera 3021 may be disposed at a corresponding position on the same plane as the second area array detection camera 3022, or may be disposed at a corresponding position on a different plane from the second area array detection camera 3022.

The second motion apparatus in the dimension detection device according to the embodiments of the present application can drive the second image acquisition assembly to move in two different directions, allowing the second image acquisition assembly to acquire image feature values from a larger area range on the other end surface of the battery to be tested, thereby improving the detection precision of subsequent detection based on the image feature values. In some embodiments, the above second area array detection cameras disposed at different positions can form a backlight scene to complete the detection operation. The backlight can be used to highlight the hole position features of the thin sheet while blurring the interference on the product surface, thereby achieving the effect of improving measurement precision.

Figure 6:
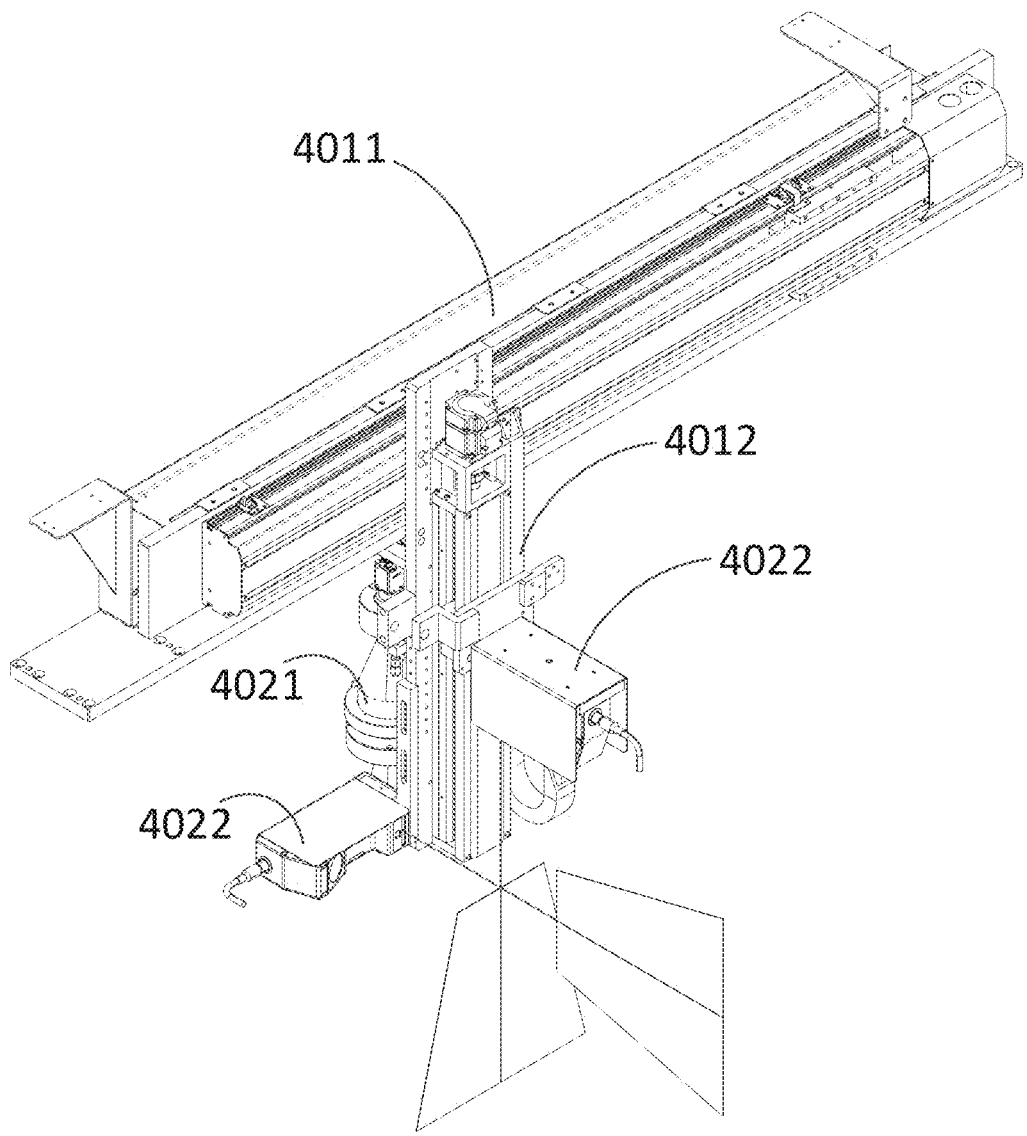
FIG. 6 is a schematic structural diagram of a third motion apparatus according to an embodiment.

In one embodiment, the dimension detection device shown in FIG. 1 further includes a third dimension detection apparatus 40, the third dimension detection apparatus 40 being disposed on the frame 10; the third dimension detection apparatus 40 includes a third motion apparatus 401 and a third image acquisition assembly 402, the third image acquisition assembly 402 is positioned above the battery to be tested, and the third motion apparatus 401 is capable of driving the third image acquisition assembly 402 to move (reference numerals of 401 are not shown in FIG. 1, and the third motion apparatus 401 includes a third linear motion mechanism 4011 and a third lifting mechanism 4012 in FIG. 6, that is, the reference numerals of 401 include 4011 and 4012; reference numerals of 402 are not shown in FIG. 1, and the third image acquisition assembly 402 includes a third contour camera 4022 and a third area array detection camera 4021 in FIG. 6, that is, the reference numerals of 402 include 4021 and 4022).

In some embodiments, as shown in FIG. 6, the third motion apparatus 401 (reference numerals of 401 are not shown in FIG. 6, and 401 includes 4011 and 4012) includes a third linear motion mechanism 4011 and a third lifting mechanism 4012; the third linear motion mechanism 4011 is configured to be capable of driving the third lifting mechanism 4012 to move in the first direction or the second direction, the second direction being within a horizontal plane and intersecting with the first direction; the third image acquisition assembly 402 (reference numerals of 402 are not shown in FIG. 6) is installed on the third lifting mechanism 4012, and the third lifting mechanism 4012 is configured to be capable of driving the third image acquisition assembly 402 to lift.

The above third linear motion mechanism 4011 may be a horizontal sliding shaft provided with a sliding block, and the sliding block can move on the horizontal sliding shaft. The third lifting mechanism 4012 is installed on the sliding block, thereby driving the third lifting mechanism 4012 to move in the horizontal direction. The third lifting mechanism 4012 may be a perpendicular sliding shaft provided with a sliding block, and the sliding block can move on the perpendicular sliding shaft. The third image acquisition assembly 402 is installed on the sliding block, thereby driving the third image acquisition assembly 402 to move in the vertical direction.

In some embodiments, the third image acquisition assembly 402 may include a third area array detection camera 4021 and at least two third contour cameras 4022, the third area array detection camera 4021 and the third contour cameras being both disposed toward the battery to be tested (only two third contour cameras 4022 are shown in FIG. 6, but the number of the third contour cameras 4022 is not limited). The third contour camera 4022 is configured to acquire a contour feature image of the top surface of the product to be detected and to complete top surface contour tolerance detection. The third area array detection camera 4021 is configured to acquire a hole feature image on the top surface of the product to be detected and to complete top surface panel hole detection. The above third image acquisition assembly 402 can be configured for product reference establishment, i.e., based on testing requirements, the coordinate system features of the product need to be established, and the reference establishment logic needs to comply with the "surface-line-point" principle. During the establishment of a reference A, the third contour camera 4022 at the top can be utilized to detect the reference point acquisition positions around the battery to be tested in the detection area. Subsequently, a reference B and a reference C are established through the third area array detection camera 4021 and the calibrated coordinate system association. Since the reference B is positioned on a platform perpendicular to the plane of the reference A and is relatively far apart in the left-right direction, the precision of reference feature establishment needs to be improved. Therefore, the third motion apparatus 401 is employed to link the light source in the direction of the end surface material inlet with the camera in the direction of the end surface material outlet, ensuring that the light source and the camera are positioned at the same height to form a backlight environment, thereby effectively avoiding the impact of product consistency while highlighting the feature edge contours. Finally, since the orientation of the reference C is constrained by the reference A and the reference B, the third contour camera 4022 can be used to complete the establishment in this case, thereby ensuring the precision of the detection starting point of each camera in the dimension detection device to some extent.

In some embodiments, when the third image acquisition assembly 402 includes a plurality of third contour cameras 4022, each third contour camera 4022 may be disposed at a different position on the third lifting mechanism 4012, and the field of view directions of different third contour cameras 4022 are different. For example, when the third image acquisition assembly 402 includes two third contour cameras 4022, one third contour camera 4022 may be disposed at a first position on the third lifting mechanism 4012, and the other third contour camera 4022 may be disposed at a second position on the third lifting mechanism 4012. The field of view direction of the third contour camera 4022 at the first position is perpendicular to the field of view direction of the third contour camera 4022 at the second position.

In some embodiments, before using the third area array detection camera 4021 and the third contour camera 4022, it is needed to correspond the pixel dimensions and working dimensions of the third area array detection camera 4021 and the third contour camera 4022. The third area array detection camera 4021 and the third contour camera 4022 can calculate the field of view by measuring the planned workstation working distance and lens parameters, and then calculate the actual distance corresponding to a single pixel based on the corresponding field of view. After completing the calculation, the theoretical operating distance of the third area array detection camera 4021 and the third contour camera 4022 at the working distance can be obtained. The third contour camera 4022 may be a 3D line laser camera.

In some embodiments, before use, the third area array detection camera 4021 and the third contour camera 4022 need to be subjected to coordinate system calibration based on the measurement value and image feature value of the calibration block. Specifically, according to the Euclidean transformation principle, the corresponding coordinate system rigid body transformation equations and rotation matrix equations can be imported from the measurement value and image feature value of the corresponding calibration block, to obtain the association between the camera coordinate system and the product coordinate system (or world coordinate system). Moreover, based on this association, the coordinate systems of different cameras at different image acquisition stations can be projected onto the product coordinate system, thereby constructing a visual test system through calculation to realize the behavioral tolerance test function.

It should be noted that before the calibration based on the calibration block described above, the measurement room needs to use a higher-precision measurement device (for example, a gantry coordinate measuring machine) to measure the calibration block, so as to obtain the measurement value of the calibration block. The calibration block may be designed to be a 1:1 replica of the product, and meanwhile, the design features of the detection position are needed to simulate the working state of the device. In some embodiments, the material of the calibration block should meet the requirements of roughness <3.2, and the fluctuation of the geometric tolerance of each plane <5% of the test tolerance. Moreover, the consistency of the material around the design features of the calibration block should meet the test requirements based on the measurement logic and the arrangement of the measurement points. The calibration is not limited to position tolerance, contour tolerance, and flatness dimensions.

Any one of the above embodiments provides a visual dimension detection device applied to large-dimension battery packs. A 3D line laser camera (contour camera) is adopted to correspond to the characteristics of multi-point data acquisition and calculation features, while a 2D area array camera is used to match hole positions and dimensions with high consistency, thereby improving test efficiency while simplifying measurement operations. Meanwhile, when measuring hole dimension tolerances, the device uses end surface dimension cameras at different positions (such as a front camera and a rear light source), which move to form a backlight scene to complete the detection operation. The backlight is used to highlight the hole position features of the thin sheet while blurring the interference on the product surface, thereby achieving the effect of improving measurement precision. Additionally, through camera system calibration, the device enables automated, contactless detection of large-dimension products while meeting the takt time requirements. Each detection shaft system is adjustable, facilitating subsequent modifications, maintenance, and replacement. These elements work together to achieve a combination of high efficiency and high yield.

Figure 7:
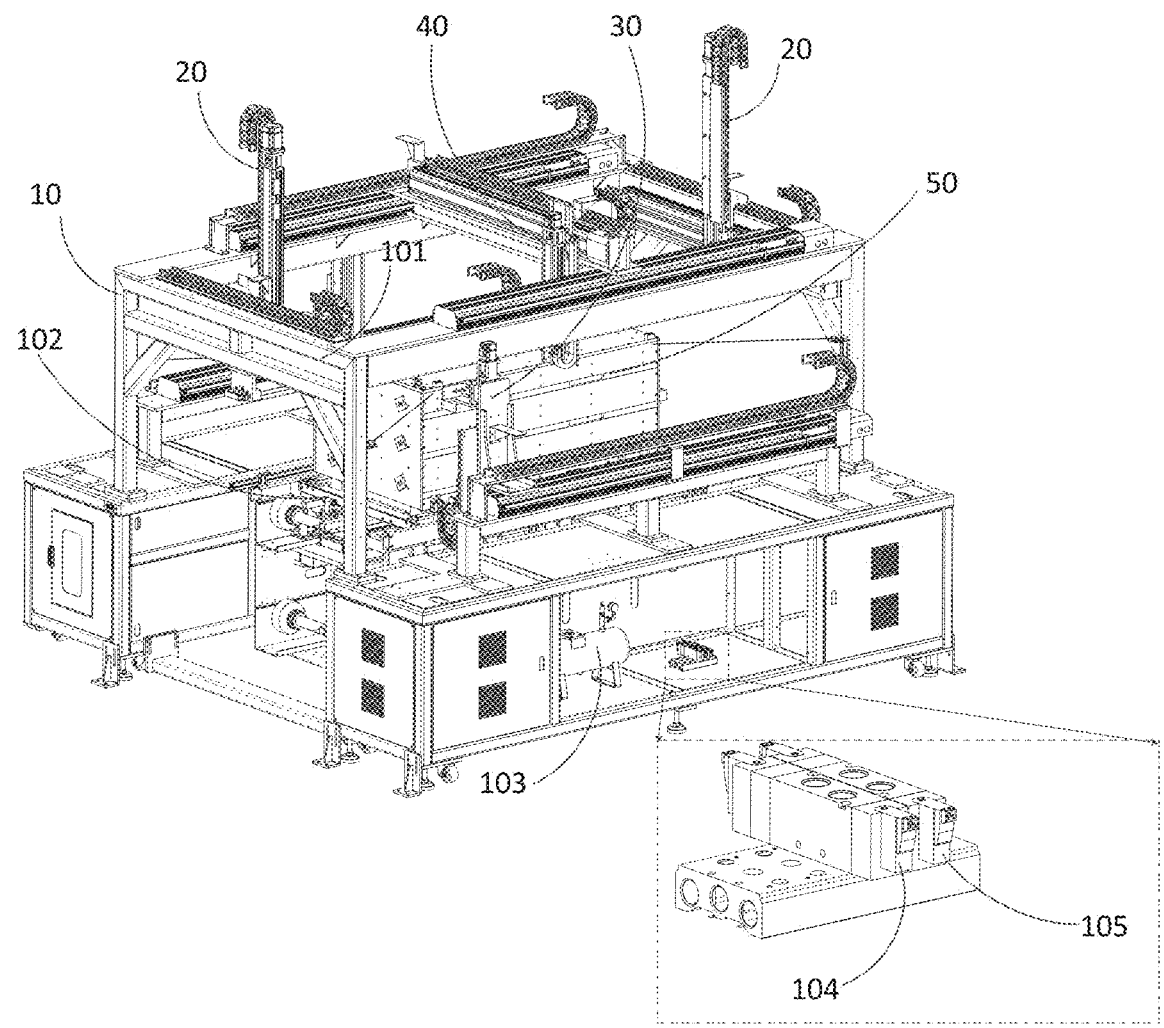
FIG. 7 is a schematic diagram of an overall structure of a dimension detection device according to another embodiment.

In one embodiment, as shown in FIG. 7, the frame 10 of the dimension detection device shown in FIG. 1 may include a fixed frame body 101 and a lifting platform 102, and the first dimension detection apparatus 20 and the second dimension detection apparatus 30 are both disposed on the fixed frame body 101; the battery 50 to be tested may be disposed in a detection area on the lifting platform 102. In some embodiments, the lifting platform 102 includes a workbench and a fourth lifting mechanism disposed at the bottom of the workbench, and the battery 50 to be tested is disposed in a detection area on the workbench. In some embodiments, the lifting platform 102 further includes a height sensor disposed on the workbench, the height sensor being configured to detect a height of the battery 50 to be tested positioned in the detection area.

A tray can be disposed on the workbench to carry the battery 50 to be tested. The tray can be jacked up by a dual-cylinder jacking station, during which the positioning pins of the jacking station guide the left-right positioning of the tray based on the positioning holes at the bottom of the tray. In some embodiments, the positioning pins feature a beveled design to facilitate correction when the tray position does not match the jacking station. In some embodiments, a pull wire is further disposed on the lifting platform 102, and the pull wire is equipped with a pressure-stabilizing circuit and a hard limit to ensure that the height consistency difference of the product at the detection station remains within an allowable range. The above height sensor can detect the height of the table to sense the presence or absence of the tray, material, and the like. Moreover, the above height sensor can implement error-proofing in the operation of the mechanism, thereby preventing collisions of the devices during operation when the battery 50 to be tested is not in place. In the actual detection device, due to the characteristics of large dimension and heavy weight of the battery 50 to be tested, and the need for reference positioning of the battery 50 to be tested during use to ensure the measurement results, it is needed to design an air circuit structure with a pressure-stabilizing circuit. Meanwhile, considering the load-bearing design, a dual-cylinder drive is adopted. To prevent the asynchronous cylinder output, a multi-solenoid valve control is designed to reduce the asynchronous issues. The pilot valve and the air tank are designed in the air intake circuit as part of the pressure-stabilizing circuit, which can maintain stable working pressure to some extent; additionally, the pilot valve and the air tank serve as a pressure-stabilizing apparatus in the event of an unexpected air supply failure, preventing rapid descent during jacking and thereby ensuring the safety of the operator to some extent.

In some embodiments, the above fourth lifting mechanism may be a jacking cylinder mechanism, and the fourth lifting mechanism may be further provided with a pressure-stabilizing air tank 103, a pilot air intake check valve 104, and a pilot air exhaust check valve 105, which are configured to supply air independently during operation. In some embodiments, a throttle valve can be designed at the air inlet of the cylinder to adjust the air intake flow of the air circuit, thereby ensuring that the jacking speeds of the cylinders on two sides are consistent. In some embodiments, a floating joint is disposed at the top of the cylinder to reduce the impact of different speeds on the mechanism. The pressure-stabilizing cylinder and the pilot valve can maximize the air pressure stability during each jacking, thereby improving detection precision. In some embodiments, the above workbench may be further provided with a jacking stop. In some embodiments, to ensure data accuracy during operation, it is needed to ensure that the product is stable and unique in the position of the device. To ensure position stability, positioning pins based on a one-side, two-pin positioning logic can be disposed on the workbench.

In some embodiments, a cabinet may be further disposed on the above fixed frame body 101, and the cabinet can be used to place apparatuses or devices such as a pressure-stabilizing tank, a solenoid valve, a controller, and the like.

In one embodiment, the dimension detection device shown in FIG. 1 further includes a controller (not shown in FIG. 1) disposed on the frame 10, and the controller is capable of driving the first motion apparatus 201 to drive the first image acquisition assembly 202 to move and driving the second motion apparatus 301 to drive the second image acquisition assembly 302 to move.

The above controller may be separately connected to the first motion apparatus 201, the first image acquisition assembly 202, the second motion apparatus 301, the second image acquisition assembly 302, the third motion apparatus 401, and the third image acquisition assembly 402. Additionally, when the first image acquisition assembly 202 and the second image acquisition assembly 302 are driven to acquire the feature images, each feature on the battery 50 to be tested can be subjected to point acquisition. The top surface, two side surfaces, and two end surfaces of the battery 50 to be tested need to complete the construction of a planar point cloud through the above image acquisition assemblies, so as to complete the contour tolerance detection. For the hole feature at the top, the third image acquisition assembly 402 at the top is used to complete the image acquisition and the position tolerance detection. In some embodiments, the above controller may be further connected to a fourth lifting mechanism to control the lifting operation of the workbench, enabling the feeding and discharging of the battery 50 to be tested and the calibration block. In some embodiments, the above controller may be further connected to a height sensor for reading the height data acquired by the height sensor, thereby determining whether the product on the workbench is in a normal detection state.

In the embodiments of the present application, the controller can calculate a deviation S1 between the actual feature value and the measurement value through the measurement value of the calibration block and the actual feature value of the battery 50 to be tested acquired by the aforementioned image acquisition assemblies. Meanwhile, a transformation equation P between the product coordinate system and the world coordinate system can be derived through the reference and the calibration of the image acquisition assemblies. Based on the deviation, the following equation (1) can be obtained:

$$D = L * P - (S0 + S1); \quad (1)$$

where D represents a distance between the feature and the discussion reference plane (or discussion reference line) in the world coordinate system of the battery to be tested; L represents a standard distance of the feature of the battery to be tested in the product coordinate system (for example, the distance between the hole and the reference line); S0 represents the feature value of the actual feature in the calibration block coordinate system; S1 represents the deviation between the actual feature value and the measurement value; and P represents the transformation equation between the product coordinate system and the calibration block coordinate system (i.e., the world coordinate system).

Based on the above equation (1), and using the geometric tolerance calculation method along with the deviation amount obtained from testing, the geometric tolerance reference data (e.g., straightness and flatness) can be obtained. For example, the above D can be used to calculate the straightness in shape tolerance. The method according to the embodiments of the present application can ultimately achieve accurate product data measurement through precise measurement control, significantly reducing the yield rate loss from manual testing, while reducing the time spent on conventional gauge maintenance and measurement, thereby improving product production efficiency to some extent and further reducing production costs. It should be noted that the above geometric tolerance calculation method may be an existing geometric tolerance calculation method, which can be divided into, for example, shape tolerance calculation, position tolerance calculation, orientation tolerance calculation, and the like. The shape tolerance calculation includes straightness, flatness, roundness, cylindricity, line contour, surface contour, and the like; the orientation tolerance calculation includes parallelism, inclination, perpendicularity, and the like; the position tolerance calculation includes position, concentricity, symmetry, and the like. The specific implementation of the geometric tolerance calculation method is not elaborated herein.

Based on the dimension detection device according to any one of the above embodiments, a dimension detection process or dimension detection method is implemented. The dimension detection method includes: controlling the first motion apparatus to drive the first image acquisition assembly to move to a detection area to detect the battery to be tested, and controlling the second motion apparatus to drive the second image acquisition assembly to move to the detection area to detect the battery to be tested to obtain a detection result. Specifically, during the detection process, the battery to be tested can be placed on the workbench in the frame. The first motion apparatus is driven to drive the first image acquisition assembly to move to a first fixed position near the battery in the detection area, while the second motion apparatus is driven to drive the second image acquisition assembly to move to a second fixed position near the battery in the detection area. This allows the first image acquisition assembly and the second image acquisition assembly to acquire the respective captured battery images. Before conducting the specific test, the first image acquisition assembly and the second image acquisition assembly can be calibrated using the calibration block to establish the association between the world coordinate system and the camera coordinate system of the measurement points, or the association between the product coordinate system and the camera coordinate system of the measurement points. During the specific test, the actual measurement dimension can be calculated according to the above association. Based on the dimension detection method according to the embodiments of the present application, the motion apparatus and the image acquisition assembly can be utilized to automatically capture images of extra-large dimension batteries and automatically capture measurement points, enabling a fully automated detection method, thereby achieving more efficient and highly precise detection of the extra-large dimension batteries.

Figure 8:
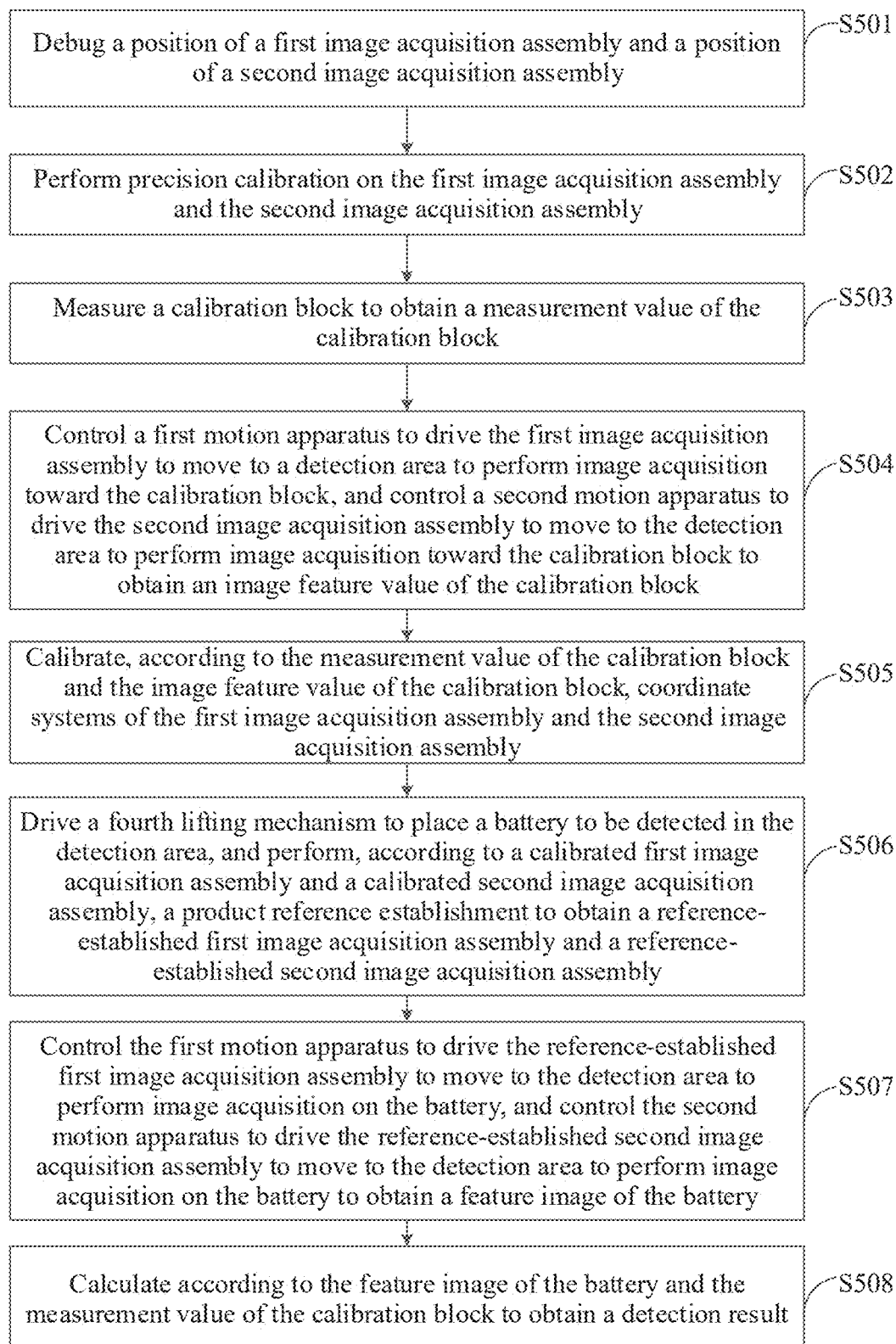
FIG. 8 is a schematic diagram of a dimension detection process according to an embodiment.

In some embodiments, based on the dimension detection device according to any one of the above embodiments, another dimension detection process or dimension detection method is provided. As shown in FIG. 8, the method includes: S501, debugging a position of the first image acquisition assembly and a position of the second image acquisition assembly; S502, performing precision calibration on the first image acquisition assembly and the second image acquisition assembly; S503, measuring the calibration block to obtain the measurement value of the calibration block; S504, controlling the first motion apparatus to drive the first image acquisition assembly to move to the detection area to perform image acquisition toward the calibration block, and controlling the second motion apparatus to drive the second image acquisition assembly to move to the detection area to perform image acquisition toward the calibration block to obtain the image feature value of the calibration block; S505, calibrating, according to the measurement value of the calibration block and the image feature value of the calibration block, coordinate systems of the first image acquisition assembly and the second image acquisition assembly; S506, driving the fourth lifting mechanism to place the battery to be tested in the detection area, and performing, according to the calibrated first image acquisition assembly and the calibrated second image acquisition assembly, a product reference establishment to obtain a reference-established first image acquisition assembly and a reference-established second image acquisition assembly; S507, controlling the first motion apparatus to drive the reference-established first image acquisition assembly to move to the detection area to perform image acquisition on the battery, and controlling the second motion apparatus to drive the reference-established second image acquisition assembly to move to the detection area to perform image acquisition on the battery to obtain the feature image of the battery; and S508, calculating according to the feature image of the battery and the measurement value of the calibration block to obtain a detection result.

It should be noted that, when the computer device measures the calibration block, a measuring instrument can be used to measure the calibration block to obtain the measurement value of the calibration block. In some embodiments, the computer device can also control the fourth lifting mechanism at the bottom of the workbench to place a preset calibration block in the detection area, and measure the calibration block in the detection area to obtain the measurement value of the calibration block.

The dimension detection device according to any one of the above embodiments can solve the following problems: 1) The automatic detection process replaces manual detection by personnel, improving production line efficiency, reducing hoisting dimension, and improving the yield rate of the device. 2) As a visual detection device, the dimension detection device can improve detection precision. The image acquisition assemblies on the dimension detection device, after spatial calibration, can precisely detect geometric tolerances while also outputting quantitative data and reports for process optimization. 3) The image acquisition assembly in the dimension detection device also adopts an optimized lighting method, improving dimension tolerance detection precision and increasing the compatibility of the device with fluctuations in incoming product materials.

In one embodiment, provided is a computer device, including a memory and a processor. The memory stores a computer program therein, and the processor, when executing the computer program, implements the following steps:

debugging a position of the first image acquisition assembly and a position of the second image acquisition assembly;

performing precision calibration on the first image acquisition assembly and the second image acquisition assembly;

measuring the calibration block to obtain the measurement value of the calibration block;

controlling the first motion apparatus to drive the first image acquisition assembly to move to the detection area to perform image acquisition toward the calibration block, and controlling the second motion apparatus to drive the second image acquisition assembly to move to the detection area to perform image acquisition toward the calibration block to obtain the image feature value of the calibration block;

calibrating, according to the measurement value of the calibration block and the image feature value of the calibration block, coordinate systems of the first image acquisition assembly and the second image acquisition assembly;

driving the fourth lifting mechanism to place the battery to be tested in the detection area, and performing, according to a calibrated first image acquisition assembly and a calibrated second image acquisition assembly, a product reference establishment to obtain a reference-established first image acquisition assembly and a reference-established second image acquisition assembly;

controlling the first motion apparatus to drive the reference-established first image acquisition assembly to move to the detection area to perform image acquisition on the battery, and controlling the second motion apparatus to drive the reference-established second image acquisition assembly to move to the detection area to perform image acquisition on the battery to obtain the feature image of the battery; and calculating according to the feature image of the battery and the measurement value of the calibration block to obtain a detection result.

In one embodiment, provided is a computer-readable storage medium storing a computer program thereon. The computer program, when executed by a processor, causes the processor to implement the following steps:

debugging a position of the first image acquisition assembly and a position of the second image acquisition assembly;

performing precision calibration on the first image acquisition assembly and the second image acquisition assembly;

measuring the calibration block to obtain the measurement value of the calibration block;

controlling the first motion apparatus to drive the first image acquisition assembly to move to the detection area to perform image acquisition toward the calibration block, and controlling the second motion apparatus to drive the second image acquisition assembly to move to the detection area to perform image acquisition toward the calibration block to obtain the image feature value of the calibration block;

calibrating, according to the measurement value of the calibration block and the image feature value of the calibration block, coordinate systems of the first image acquisition assembly and the second image acquisition assembly;

driving the fourth lifting mechanism to place the battery to be tested in the detection area, and performing, according to a calibrated first image acquisition assembly and a calibrated second image acquisition assembly, a product reference establishment to obtain a reference-established first image acquisition assembly and a reference-established second image acquisition assembly;

controlling the first motion apparatus to drive the reference-established first image acquisition assembly to move to the detection area to perform image acquisition on the battery, and controlling the second motion apparatus to drive the reference-established second image acquisition assembly to move to the detection area to perform image acquisition on the battery to obtain the feature image of the battery; and calculating according to the feature image of the battery and the measurement value of the calibration block to obtain a detection result.

It can be understood by those of ordinary skill in the art that all or part of the processes in the methods of the above embodiments may be implemented by executing a computer program to instruct the relevant hardware. The computer program may be stored in a non-volatile computer-readable storage medium. The computer program, when executed, may include the processes in the methods of the above embodiments. Any reference to a memory, a database, or other media used in the embodiments according to the present application can include at least one of a non-volatile memory or a volatile memory. The non-volatile memory may include a read-only memory (ROM), a magnetic tape, a floppy disk, a flash memory, an optical storage, a high-density embedded non-volatile memory, a resistive random access memory (ReRAM), a magnetoresistive random access memory (MRAM), a ferroelectric random access memory (FRAM), a phase change memory (PCM), a graphene memory, and the like. The volatile memory may include a random access memory (RAM), a external cache memory, and the like. By way of illustration and not limitation, RAM may be in various forms, such as a static random access memory (SRAM) or a dynamic random access memory (DRAM). The database involved in the embodiments according to the present application may include at least one of a relational database or a non-relational database. The non-relational database may include, but is not limited to, a blockchain-based distributed database. The processor involved in the embodiments according to the present application may be a general-purpose processor, a central processing unit, a graphics processor, a digital signal processor, a programmable logic unit, a data processing logic unit based on quantum computation, etc., but is not limited thereto.

The technical features of the above embodiments may be arbitrarily combined. For the sake of concise description, not all possible combinations of the technical features in the above embodiments have been described. However, as long as there is no contradiction between the combinations of these technical features, they should be considered as falling within the scope of the specification.

The technical features of the above embodiments may be arbitrarily combined. For the sake of concise description, not all possible combinations of the technical features in the above embodiments have been described. However, as long as there is no contradiction between the combinations of these technical features, they should be considered as falling within the scope of the specification.

The above embodiments represent only several implementations of the present application, and the description thereof is specific and detailed, but should not be understood as limiting the patent scope of the present application. It should be noted that several variations and improvements may be made by those of ordinary skill in the art without departing from the concept of the present application, and these variations and improvements are all within the scope of protection of the present application. Therefore, the scope of protection of the present application should be subject to the appended claims.

What is claimed is:

1. A dimension detection device, comprising:
    a frame, having a detection area for placing a battery to be tested;
    at least two first dimension detection apparatuses disposed on the frame, the at least two first dimension detection apparatuses being positioned on two opposite sides of the battery to be tested; and
    at least two second dimension detection apparatuses disposed on the frame, the at least two second dimension detection apparatuses being positioned on other two opposite sides of the battery to be tested;
    wherein:
        the first dimension detection apparatus comprises a first motion apparatus and a first image acquisition assembly, and the first motion apparatus is capable of driving the first image acquisition assembly to move;
        the second dimension detection apparatus comprises a second motion apparatus and a second image acquisition assembly, and the second motion apparatus is capable of driving the second image acquisition assembly to move;
        the first motion apparatus comprises a first linear motion mechanism and a first lifting mechanism; the first linear motion mechanism is configured to be capable of driving the first lifting mechanism to move in a first direction, the first direction being within a horizontal plane; and the first image acquisition assembly is installed on the first lifting mechanism, and the first lifting mechanism is configured to be capable of driving the first image acquisition assembly to lift; and
        the second motion apparatus comprises a second linear motion mechanism and a second lifting mechanism; the second linear motion mechanism is configured to be capable of driving the second lifting mechanism to move in a second direction, the second direction being within a horizontal plane and intersecting with the first direction; and the second image acquisition assembly is installed on the second lifting mechanism, and the second lifting mechanism is configured to be capable of driving the second image acquisition assembly to lift.

2. The dimension detection device according to claim 1, wherein the first image acquisition assembly comprises a first contour camera and at least one first area array detection camera, the first contour camera and the first area array detection camera being both disposed toward the battery to be tested.

3. The dimension detection device according to claim 2, wherein the second image acquisition assembly comprises a second contour camera and at least one second area array detection camera, the second contour camera and the second area array detection camera being both disposed toward the battery to be tested.

4. The dimension detection device according to claim 1, wherein:
    the dimension detection device further comprises a third dimension detection apparatus, the third dimension detection apparatus being disposed on the frame; and
    the third dimension detection apparatus comprises a third motion apparatus and a third image acquisition assembly, the third image acquisition assembly is positioned above the battery to be tested, and the third motion apparatus is capable of driving the third image acquisition assembly to move.

5. The dimension detection device according to claim 4, wherein:
    the third motion apparatus comprises a third linear motion mechanism and a third lifting mechanism;
    the third linear motion mechanism is configured to be capable of driving the third lifting mechanism to move in the first direction or the second direction, the second direction being within a horizontal plane and intersecting with the first direction; and
    the third image acquisition assembly is installed on the third lifting mechanism, and the third lifting mechanism is configured to be capable of driving the third image acquisition assembly to lift.

6. The dimension detection device according to claim 4, wherein the third image acquisition assembly comprises a third area array detection camera and at least two third contour cameras, the third area array detection camera and the third contour cameras being both disposed toward the battery to be tested.

7. The dimension detection device according to claim 1, wherein:
    the frame comprises a fixed frame body and a lifting platform, and the first dimension detection apparatus and the second dimension detection apparatus are both disposed on the fixed frame body; and
    the battery to be tested is disposed in a detection area on the lifting platform.

8. The dimension detection device according to claim 7, wherein the lifting platform comprises a workbench and a fourth lifting mechanism disposed at a bottom of the workbench, and the battery to be tested is disposed in a detection area on the workbench.

9. The dimension detection device according to claim 8, wherein the lifting platform further comprises a height sensor disposed on the workbench, the height sensor being configured to detect a height of the battery to be tested disposed in the detection area.

10. The dimension detection device according to claim 1, wherein the dimension detection device further comprises a controller disposed on the frame, and the controller is capable of driving the first motion apparatus to drive the first image acquisition assembly to move and driving the second motion apparatus to drive the second image acquisition assembly to move.

11. A dimension detection method, applied to the dimension detection device according to claim 1, comprising:

controlling the first motion apparatus to drive the first image acquisition assembly to move to the detection area to detect the battery to be tested, and controlling the second motion apparatus to drive the second image acquisition assembly to move to the detection area to detect the battery to be tested to obtain a detection result.

12. The method according to claim 11, further comprising:
calibrating, according to a measurement value of a preset calibration block and an image feature value of the calibration block, coordinate systems of the first image acquisition assembly and the second image acquisition assembly to obtain a calibrated first image acquisition assembly and a calibrated second image acquisition assembly;
wherein controlling the first motion apparatus to drive the first image acquisition assembly to move to the detection area to detect the battery to be tested, and controlling the second motion apparatus to drive the second image acquisition assembly to move to the detection area to detect the battery to be tested to obtain the detection result comprises:
controlling the first motion apparatus to drive the calibrated first image acquisition assembly to move to the detection area to detect the battery to be tested, and controlling the second motion apparatus to drive the calibrated second image acquisition assembly to move to the detection area to detect the battery to be tested to obtain the detection result.

13. The method according to claim 12, wherein the image feature value of the calibration block is obtained by:
controlling the first motion apparatus to drive the first image acquisition assembly to move to the detection area to perform image acquisition toward the calibration block, and controlling the second motion apparatus to drive the second image acquisition assembly to move to the detection area to perform image acquisition toward the calibration block to obtain the image feature value of the calibration block.

14. The method according to claim 12, wherein the frame of the dimension detection device comprises the fixed frame body and the lifting platform, the lifting platform comprises the workbench and the fourth lifting mechanism disposed at the bottom of the workbench, and a method for obtaining the measurement value of the calibration block comprises:
controlling the fourth lifting mechanism to place the preset calibration block in the detection area; and
measuring the calibration block to obtain the measurement value of the calibration block.

15. The method according to claim 14, wherein controlling the first motion apparatus to drive the calibrated first image acquisition assembly to move to the detection area to detect the battery to be tested, and controlling the second motion apparatus to drive the calibrated second image acquisition assembly to move to the detection area to detect the battery to be tested to obtain the detection result comprises:
driving the fourth lifting mechanism to place the battery to be tested in the detection area;
controlling the first motion apparatus to drive the calibrated first image acquisition assembly to move to the detection area to perform image acquisition on the battery to be tested, and controlling the second motion apparatus to drive the calibrated second image acquisition assembly to move to the detection area to perform image acquisition on the battery to be tested to obtain a feature image of the battery to be tested; and
obtaining, according to the feature image of the battery to be tested and the measurement value of the calibration block, the detection result.

16. The method according to claim 15, further comprising:
performing, according to the calibrated first image acquisition assembly and the calibrated second image acquisition assembly, a product reference establishment to obtain a reference-established first image acquisition assembly and a reference-established second image acquisition assembly;
wherein controlling the first motion apparatus to drive the calibrated first image acquisition assembly to move to the detection area to perform image acquisition on the battery to be tested, and controlling the second motion apparatus to drive the calibrated second image acquisition assembly to move to the detection area to perform image acquisition on the battery to be tested to obtain the feature image of the battery to be tested comprises:
controlling the first motion apparatus to drive the reference-established first image acquisition assembly to move to the detection area to perform image acquisition on the battery to be tested, and controlling the second motion apparatus to drive the reference-established second image acquisition assembly to move to the detection area to perform image acquisition on the battery to be tested to obtain the feature image of the battery to be tested.

17. The method according to claim 11, further comprising:
debugging a position of the first image acquisition assembly and a position of the second image acquisition assembly.

18. The method according to claim 11, further comprising:
performing precision calibration on the first image acquisition assembly and the second image acquisition assembly.

* * * * *